United States Patent
Li et al.

(10) Patent No.: US 8,363,061 B2
(45) Date of Patent: Jan. 29, 2013

(54) ELECTRONIC APPARATUS WITH QUICK RESPONSE TIME AND METHOD THEREOF

(75) Inventors: Xiao-Guang Li, Shenzhen (CN); Cheng-Hao Chou, Taipei Hsien (TW); Kuan-Hong Hsieh, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 892 days.

(21) Appl. No.: 12/412,377

(22) Filed: Mar. 27, 2009

(65) Prior Publication Data

US 2010/0060656 A1    Mar. 11, 2010

(30) Foreign Application Priority Data

Sep. 10, 2008  (CN) .......................... 2008 1 0304435

(51) Int. Cl.
*G06F 13/00* (2006.01)
*G09G 5/36* (2006.01)

(52) U.S. Cl. ........................................ 345/537; 345/557

(58) Field of Classification Search ................... 345/530, 345/536, 537, 557
See application file for complete search history.

(56) References Cited

U.S. PATENT DOCUMENTS

| | | | | |
|---|---|---|---|---|
| 6,229,951 | B1 * | 5/2001 | Schultz et al. | 386/314 |
| 2006/0044315 | A1 * | 3/2006 | Yamamoto | 345/543 |
| 2006/0069997 | A1 * | 3/2006 | Hsieh et al. | 715/713 |
| 2008/0291215 | A1 * | 11/2008 | Schick et al. | 345/619 |

FOREIGN PATENT DOCUMENTS

TW    200611136 A    4/2006

\* cited by examiner

*Primary Examiner* — Jacinta M Crawford
(74) *Attorney, Agent, or Firm* — Altis Law Group, Inc.

(57) ABSTRACT

A method with quick response time applied to the electronic apparatus is provided. The method includes: providing a storage configured for storing a plurality of images; providing a cache memory configured for temporarily storing decoded images; invoking the images that are previously to and next to the currently displayed image from the storage, decoding the invoked images, and storing the decoded images in the cache memory; receiving an instruction from user input; determining whether the instruction is for displaying a previous image or a next image; and invoking the decoded image of the image from the cache memory and displaying the selected image. A related electronic apparatus is also provided.

2 Claims, 2 Drawing Sheets

ELECTRONIC APPARATUS WITH QUICK RESPONSE TIME AND METHOD THEREOF

BACKGROUND

1. Technical Field

The disclosure relates to an electronic apparatus with quick response time and method thereof.

2. Description of Related Art

Nowadays, many electronic apparatuses, e.g., mobile phones, digital image frames, electronic readers (e-readers), are capable of storing and displaying electronic documents (e.g., digital images, digital texts, etc).

At present, when people manipulate an image of an electronic document on these electronic apparatuses, these electronic apparatuses firstly invoke the image from a storage and decode the image, and then display the image. Due to size, cost, and power constraints, processors of these electronic apparatuses are not powerful enough to respond quickly to user commands such as when a user wants to manipulate an image with high resolution.

Therefore, it is necessary to provide an electronic apparatus and a method to overcome the above-identified deficiency.

BRIEF DESCRIPTION OF THE DRAWINGS

The components of the drawings are not necessarily drawn to scale, the emphasis instead being placed upon clearly illustrating the principles of an electronic apparatus with quick response time and method thereof. Moreover, in the drawings, like reference numerals designate corresponding parts throughout several views.

DETAILED DESCRIPTION OF THE EMBODIMENTS

Figure 1:
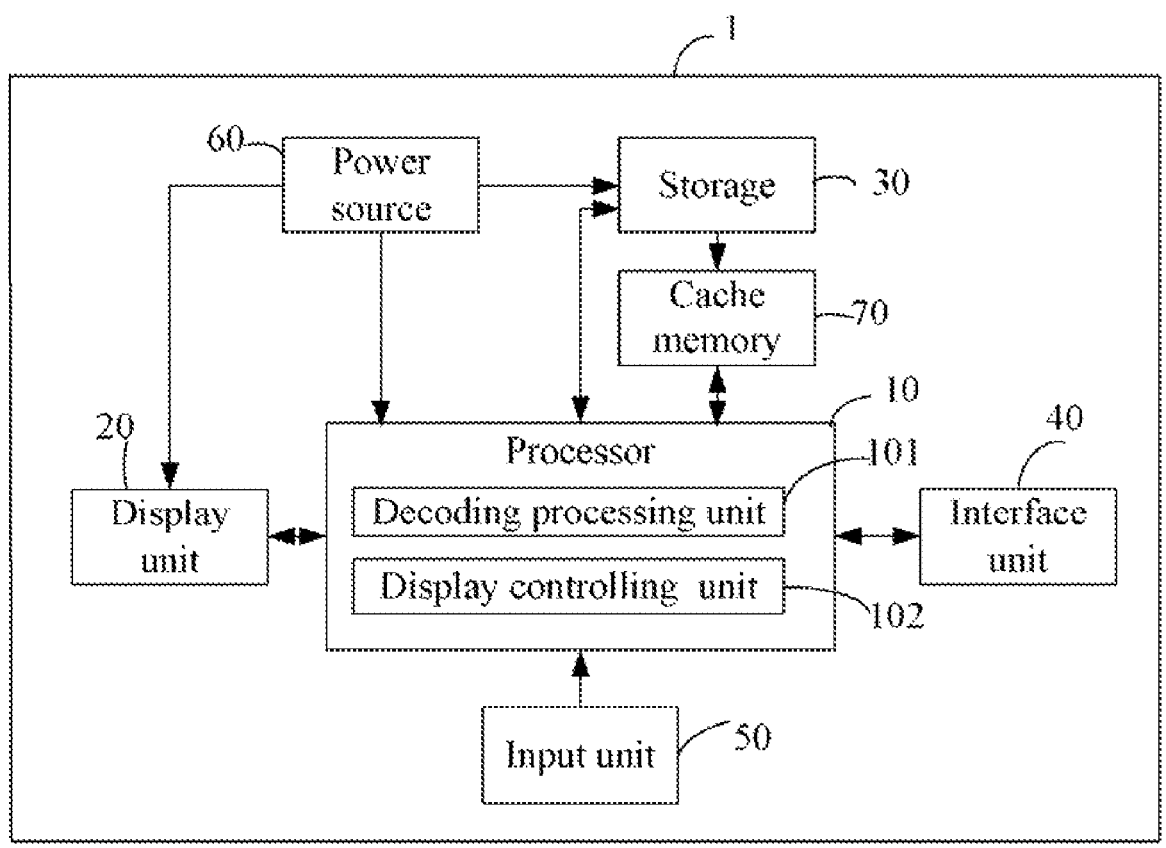
FIG. 1 is a block diagram of an electronic apparatus with quick response time in accordance with an exemplary embodiment.

FIG. 1 is a block diagram of an electronic apparatus 1 with quick response time in accordance with an exemplary embodiment.

The electronic apparatus 1 includes a processor 10, a display unit 20, a storage 30, an interface unit 40, an input unit 50, a power source 60, and a cache memory 70. The electronic apparatus 1 can be an e-reader, a mobile phone, or a digital image frame, etc.

The power source 60 is configured for providing power to elements of the electronic apparatus 1, such as the processor 10 and the display unit 20.

The interface unit 40 is configured for connecting an external apparatus (not shown). The external apparatus can be a storage card (e.g., a secure digital (SD) card, a compact flash (CF) card), or another electronic apparatus (e.g., a digital camera, a mobile phone, or a computer).

The input unit 50 is configured for generating instructions in response to user input. The input unit 50 can include input keys, a touch pad, or the like. In the exemplary embodiment, the input unit 50 is a keyboard that includes a previous button (not shown) configured for generating a previous instruction to have a previous image displayed and a next button (not shown) configured for generating a next instruction to have a next image displayed, in response to user input.

The storage 30 is configured for storing a plurality of images.

The cache memory 70 is configured for temporarily storing decoded images.

In the exemplary embodiment, the cache memory 70 temporarily stores the decoded images of the currently displayed image, the image that is previous to the currently displayed image (hereinafter, the previous image), and the image that is next to the currently displayed image (hereinafter, the next image). Accordingly, when the user browses through the images using the input unit 50, for example, operates the previous button or the next button to have a previous or next image displayed, the electronic apparatus 1 can directly invoke the decoded image of the previously or next image from the cache memory 70 and display the previous or next image. As a result, the electronic apparatus 1 is available to display a selected image with quick response time. This will be described in detail below.

The processor 10 includes a decoding processing unit 101, and a display controlling unit 102.

When the electronic apparatus 1 enters an image display mode for displaying images, the decoding processing unit 101 invokes a first image which is to be displayed, decodes the image, then stores the decoded image in the cache memory 70. The display controlling unit 102 then invokes the decoded image of the first image from the cache memory 70 and displays the first image on the display unit 20. After displaying the first image, the decoding processing unit 101 invokes the previous and next image from the storage 30, decodes the previous and next image, then stores the decoded images of the previous and next image in the cache memory 70. That is, the cache memory 70 stores the decoded images of the currently displayed image, the previous image, and the next image.

When the user browses through images using the input unit 50 in the image display mode, for example, operates the previous button or the next button to have a previous or next image displayed, the input unit 50 generates an instruction. The displaying controlling unit 102 receives the instruction and determines whether the instruction is a previous instruction or a next instruction. If a previous instruction is received, the display controlling unit 102 directly invokes the decoded image of the previous image from the cache memory 70 and displays the previous image on the display unit 20. If a next instruction is received, the display controlling unit 102 directly invokes the decoded image of the next image from the cache memory 70 and displays the next image on the display unit 20.

In this embodiment, when the display controlling unit 102 displays a selected image, e.g., the previous image or the next image, the decoding processing unit 101 deletes the decoded images, except the decoded image of the selected image, from the cache memory 70, invokes and decodes the images that are previous to and next to the selected image, then stores the decoded images that are previous to and next to the selected image in the cache memory 70.

In an alternative embodiment, when the display controlling unit 102 displays a selected image, e.g., the previous image, the decoding processing unit 101 deletes the decoded image of the image that is next to the previously displayed image from the cache memory 70, invokes and decodes the image that is previous to the selected image, then stores the decoded image in the cache memory 70. When the display controlling unit 102 displays a selected image, e.g., the next image, the decoding processing unit 101 deletes the decoded image of the image that is previous to the previously displayed image from the cache memory 70, invokes and decodes the image that is next to the selected image, then stores the decoded image in the cache memory 70.

Figure 2:
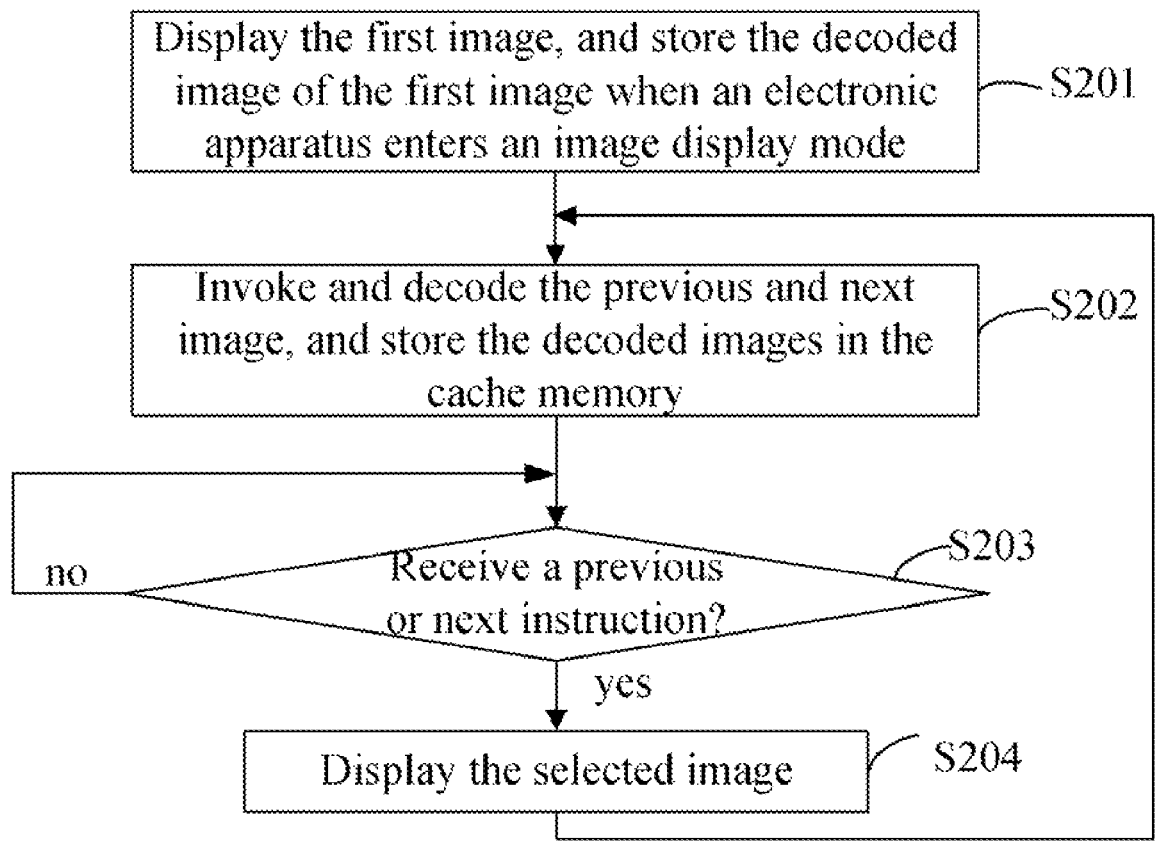
FIG. 2 is a flowchart illustrating a method for providing quick response time applied to the electronic apparatus of FIG. 1 in accordance with an exemplary embodiment.

FIG. 2 is a flowchart illustrating a method with quick response time applied to the electronic apparatus 1.

In step S201, when the electronic apparatus 1 enters the image display mode, the decoding processing unit 101 invokes and decodes a first image which is to be displayed on the display unit 20, then stores the decoded image in the cache memory 70. The display controlling unit 102 sequentially invokes the decoded image of the first image from the cache memory 70, and displays the first image on the display unit 20.

In step S202, after displaying the first image, the decoding processing unit 101 invokes and decodes the previous and next image, then stores the decoded images in the cache memory 70.

In step S203, the display controlling unit 102 determines whether a previous or next instruction is received, if yes, the procedure goes to step S204, if no, the procedure continues to execute step S203.

In step S204, if a previous or next instruction is received, the display controlling unit 102 directly invokes the decode image of the previous or next image from the cache memory 70, and displays the previous or next image on the display unit 70. After displaying the selected image, the procedure goes to step S202.

It should be noted that after the process goes from step S204 to step S202, in step S202, in this embodiment, the decoding processing unit 101 deletes the decoded images except the decoded image of the selected image from the cache memory 70, and invokes and decodes the images that are previous to and next to the selected image, then stores the decoded images in the cache memory 70.

In an alternative embodiment, in step S204, if the display controlling unit 102 displays the selected image, e.g., the previous image, in step S202, the decoding processing unit 101 deletes the decoded image of the image that is next to the previously displayed image from the cache memory 70, invokes and decodes the image that is previous to the selected image, and stores the decoded image in the cache memory 70. If the display controlling unit 102 displays the selected image, e.g., the next image, the decoding processing unit 101 deletes the decoded image of the image that is previous to the previously displayed image from the cache memory 70, invokes and decodes the data image that is next to the selected image, then stores the decoded image in the cache memory 70.

Although the present disclosure has been specifically described on the basis of preferred embodiments and method thereof, the disclosure is not to be construed as being limited thereto. Various changes or modifications may be made to the embodiments without departing from the scope and spirit of the disclosure.

What is claimed is:

1. An electronic apparatus with quick response time, comprising:
 a storage configured for storing a plurality of images;
 a cache memory configured for temporarily storing decoded images;
 an input unit configured for generating an instruction in response to user input;
 a processor comprising:
  a decoding processing unit configured for deleting the decoded images except the decoded image of a currently displayed image from the cache memory, and after displaying the currently displayed image, invoking the images that are previously to and next to the currently displayed image from the storage, decoding the invoked images, and storing the decoded images in the cache memory; and
  a display controlling unit configured for receiving the instruction from the input unit and determining whether the instruction is an instruction to display a previous image or a next image, and invoking the decoded image of the previous image or the next image from the cache memory, and displaying the previous image or the next image.

2. A method with quick response time applied to the electronic apparatus comprising:
 providing a storage configured for storing a plurality of images;
 providing a cache memory configured for temporarily storing decoded images;
 deleting the decoded images except the decoded image of a currently displayed image from the cache memory, and after displaying the currently displayed image, invoking the images that are previously to and next to the currently displayed image from the storage, decoding the invoked images, and storing the decoded images in the cache memory;
 receiving an instruction from user input;
 determining whether the instruction is for a previous image or a next image; and
 invoking the decoded image of the image that is previous to or next to the currently displayed image from the cache memory and displaying the previous image or the next image, according to the instruction.

* * * * *